US007430152B1

(12) United States Patent
Russo

(10) Patent No.: US 7,430,152 B1
(45) Date of Patent: Sep. 30, 2008

(54) SYSTEM AND METHOD OF OPERATION THEREOF FOR INCREASING ACOUSTIC BANDWIDTH OF TRANSMITTING DEVICES

(75) Inventor: Donato Russo, Hollywood, MD (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 11/820,034

(22) Filed: Jun. 4, 2007

(51) Int. Cl.
*H04B 1/59* (2006.01)

(52) U.S. Cl. ............................................... 367/2; 367/3

(58) Field of Classification Search ..................... 367/2, 367/3, 121, 123
See application file for complete search history.

(56) References Cited

U.S. PATENT DOCUMENTS

| | | | | |
|---|---|---|---|---|
| H001171 H * | 4/1993 | Fillhart et al. | ............... | 367/118 |
| 6,506,160 B1 * | 1/2003 | Van Stralen et al. | ......... | 600/459 |
| 2004/0181154 A1 * | 9/2004 | Peterson et al. | ............. | 600/459 |
| 2005/0203402 A1 * | 9/2005 | Angelsen et al. | ............ | 600/447 |

* cited by examiner

*Primary Examiner*—Dan Pihulic
(74) *Attorney, Agent, or Firm*—Mark O. Glut

(57) ABSTRACT

Disclosed is a system, and a method of operation thereof, which improves the RF link employed between a transmitting sonobuoy and an associated receiving aircraft. The sonobuoy receives acoustic information from hydrophones and transmits this information to the aircraft, via beams having a predetermined frequency spectrum. The system breaks the total frequency spectrum of the beams into sub-bands. The sub-bands are multiplexed on the RF link interconnecting the sonobuoy to the aircraft. More particularly, the frequency spectrum defining an acoustic bandwidth of about 750 Hz is broken into a selected number (e.g., 6 or 4) of sub-bands and multiplexed onto and forming the RF link.

6 Claims, 11 Drawing Sheets

| BAND NUMBER | NUMBER OF BEAMS | BEAMPOINTING ANGLES | | | | | | | | | | | | | | | | | | | | | | | |
|---|---|---|---|---|---|---|---|---|---|---|---|---|---|---|---|---|---|---|---|---|---|---|---|---|---|
| 1 | 9 | 0 | 40 | 80 | 120 | 160 | 200 | 240 | 280 | 320 | | | | | | | | | | | | | | | |
| 2 | 13 | 0 | 28 | 55 | 83 | 111 | 138 | 166 | 194 | 222 | 249 | 277 | 305 | 332 | | | | | | | | | | | |
| 3 | 15 | 0 | 24 | 48 | 72 | 96 | 120 | 144 | 168 | 192 | 216 | 240 | 264 | 288 | 312 | 336 | | | | | | | | | |
| 4 | 17 | 0 | 21 | 42 | 64 | 85 | 106 | 127 | 148 | 169 | 191 | 212 | 233 | 254 | 275 | 296 | 318 | 339 | | | | | | | |
| 5 | 20 | 0 | 18 | 36 | 54 | 72 | 90 | 108 | 126 | 144 | 162 | 180 | 198 | 216 | 234 | 252 | 270 | 288 | 306 | 324 | 342 | | | | |
| 6 | 24 | 0 | 15 | 30 | 45 | 60 | 75 | 90 | 105 | 120 | 135 | 150 | 165 | 180 | 195 | 210 | 225 | 240 | 255 | 270 | 285 | 300 | 315 | 330 | 345 |

FIG-2

| BAND NUMBER | NUMBER OF BEAMS | BEAMPOINTING ANGLES | | | | | | | | | | | | | | | | | | | | | | | |
|---|---|---|---|---|---|---|---|---|---|---|---|---|---|---|---|---|---|---|---|---|---|---|---|---|---|
| 1 | 12 | 0 | 30 | 60 | 90 | 120 | 150 | 180 | 210 | 240 | 270 | 300 | 330 | | | | | | | | | | | | |
| 2 | 16 | 0 | 23 | 45 | 67 | 90 | 112 | 135 | 157 | 180 | 202 | 225 | 247 | 270 | 295 | 315 | 337 | | | | | | | | |
| 3 | 18 | 0 | 20 | 40 | 60 | 80 | 100 | 120 | 140 | 160 | 180 | 200 | 220 | 240 | 260 | 280 | 300 | 320 | 340 | | | | | | |
| 4 | 24 | 0 | 15 | 30 | 45 | 60 | 75 | 90 | 105 | 120 | 135 | 150 | 165 | 180 | 195 | 210 | 225 | 240 | 255 | 270 | 285 | 300 | 315 | 330 | 345 |

FIG-7

SYSTEM AND METHOD OF OPERATION THEREOF FOR INCREASING ACOUSTIC BANDWIDTH OF TRANSMITTING DEVICES

ORIGIN OF THE INVENTION

The invention described herein was made in the performance of official duties by an employee of the Department of the Navy and may be manufactured, used, licensed by or for the Government for any governmental purpose without payment of any royalties thereon.

FIELD OF THE INVENTION

The invention described herein relates to increasing the acoustic bandwidth of transmitting devices and is particularly suitable for sonobuoys.

BACKGROUND OF THE INVENTION

Prior art sonobuoys typically provide for the formation of 24 beams, covering 360 degrees of azimuth from 40 hydrophones. The prior art sonobuoys are typically planar arrays of 40 elements which operate over two (2) octaves of frequency. One such sonobuoy is deployed from an ASW aircraft. For such an application, the sonobuoy is deployed in the water where it receives acoustic signals from hydrophones and transmits acoustic data, via an RF link to the aircraft.

A major constraint on the operation of the sonobuoy is the limitation that no more than 256 kbps of data may be transmitted over the present RF link. Further, due to overhead consideration, i.e., Barker codes and compass information, both known in the art, the data rate of the RF link is typically reduced to 195,765 bps. This data rate of 195,765 bps typically includes twenty-four (24) narrower patterns of radiation, commonly referred to as beams, transmitted from the sonobuoy and data from an omnidirectional phone. This limitation also causes a reduction in the acoustic bandwidth of frequencies being transmitted by the sonobuoys, typically resulting about a reduction to 500 Hz from the desired 750 Hz. The reduced bandwidth operation is typically manifested by sonobuoys transmitting one large band of only 500 Hz acoustic information.

This constraint on data rate necessitates a trade-off to be made on the amount of bandwidth and amplitude quantization that can be achieved with 24 beams, wherein quantization is the division of the range of values into finite sub-ranges. With a given array, higher frequency beams are narrower in beam width than lower frequency beams. If only one band is used across a wide frequency band, and the system employed by the sonobuoy is utilized with the upper frequency beams of the selected one band and crossing over at the 3 db operating point, then the lower frequency beams will cross over at less than 3 db, and become redundant. Further, if a beam, employed for a sonobuoy operating over two (2) octaves of frequency, at frequency $f_1$, is 15 degrees wide, then a beam at $f_1/2$ will be 30 degrees wide, favoring the use of beams at the higher frequencies. Typically, the number of beams employed for sonobuoys is determined by the upper frequency of the beams being transmitted. The prior art sonobuoys do not take into account the situation that at the lower end of the frequency beams, the beams are highly overlapping and, thus, not efficiently utilized. It is desired to more effectively utilize the lower end of the frequency band W of the beams transmitted by sonobuoys.

SUMMARY OF THE INVENTION

Accordingly, it is an object of the present invention to provide a system and a method of operation thereof, that more effectively utilizes the lower end of a frequency band W for beams being transmitted by devices and the system is particularly suited for sonobuoys.

It is a further object of the present invention to decrease the usage of the beams of sonobuoys within the lower frequency band W and keep constant the usage of the beams within the upper end of the frequency band W.

Another object of the present invention is to break the total acoustic bandwidth (750 Hz), contained with the beams transmitted from sonobuoys, into a small number of bands; e.g., four or six, rather than prior art utilization of one large band of 500 Hz.

It is a still further object of the present invention to provide a sonobuoy that transmits substantially the full acoustic bandwidth of 750 Hz, rather than the 500 Hz acoustic bandwidth provided by prior art devices.

It is another object of the present invention to provide a sonobuoy having increased capability for greater detection and classification performance created by having an acoustic bandwidth of 750 Hz contained within its transmitted beams.

In one embodiment a system is provided for transmitting, via a RF link, to remote equipment acoustic information having an acoustic bandwidth, within a predetermined frequency spectrum. The system comprises: a) an A/D converter receiving acoustic signals each having a frequency within the acoustic bandwidth. The A/D converter provides a corresponding digital output for each received acoustic signal. The system further comprises: b) one or more beam formers receiving the digital outputs of the A/D converter and providing one or more beams at respective outputs for each of the corresponding digital outputs of the A/D converter. Each of the one or more beam formers having an assigned sub-band within the predetermined frequency spectrum. The system further comprises: c) one or more band shifters respectively interconnected to the outputs of the beam formers, each of the one or more band shifters changing a frequency spectrum of a respective output of the one or more beam formers and providing a respective output; and d) one or more filters receiving the output of the one or more band shifters and providing a respective output that prohibits all, but a specified range of the frequency spectrum of respective outputs of the one or more beam formers.

The present invention provides a system and a method thereof which allows for an increase in the acoustic bandwidth of the sonobuoys from about 500 to about 750 Hz, while essentially maintaining the same RF data link bit rate. This is accomplished by breaking the total acoustic bandwidth 750 Hz into a smaller number of bands, e.g., four or six, rather than use one large band, which yielded the lower transmitted acoustic bandwidth of 500 Hz. By judicious selection of the number of bands, a smaller number of beams can be formed as a function of frequency and allowing more effective utilization of beam at the lower end of the frequency band W. This economy in beams allows for the transmission of more acoustic bandwidth within the same RF data link. Existing sonobuoys require a particular format of beam information and the present invention accommodates this requirement by providing beam interpolation techniques that are used to generate the same number of beams as required for processing systems in existing sonobuoys.

BRIEF DESCRIPTION OF THE DRAWINGS

The foregoing objects and other advantages of the present invention will be more fully understood from the foregoing detailed description and reference to the appended drawings wherein:

FIG. 2 is a table illustrating the interrelationship between the band numbers, the number of beams of each band and the beam pointing angles of each band associated with the six (6) band implementation of the system of the present invention;

FIG. 7 is a table illustrating the interrelationship between band numbers, the number of beams of each band, and the beam pointing angles associated with a four (4) beam implementation of the system of the present invention;

DETAILED DESCRIPTION OF THE INVENTION

Figure 1:
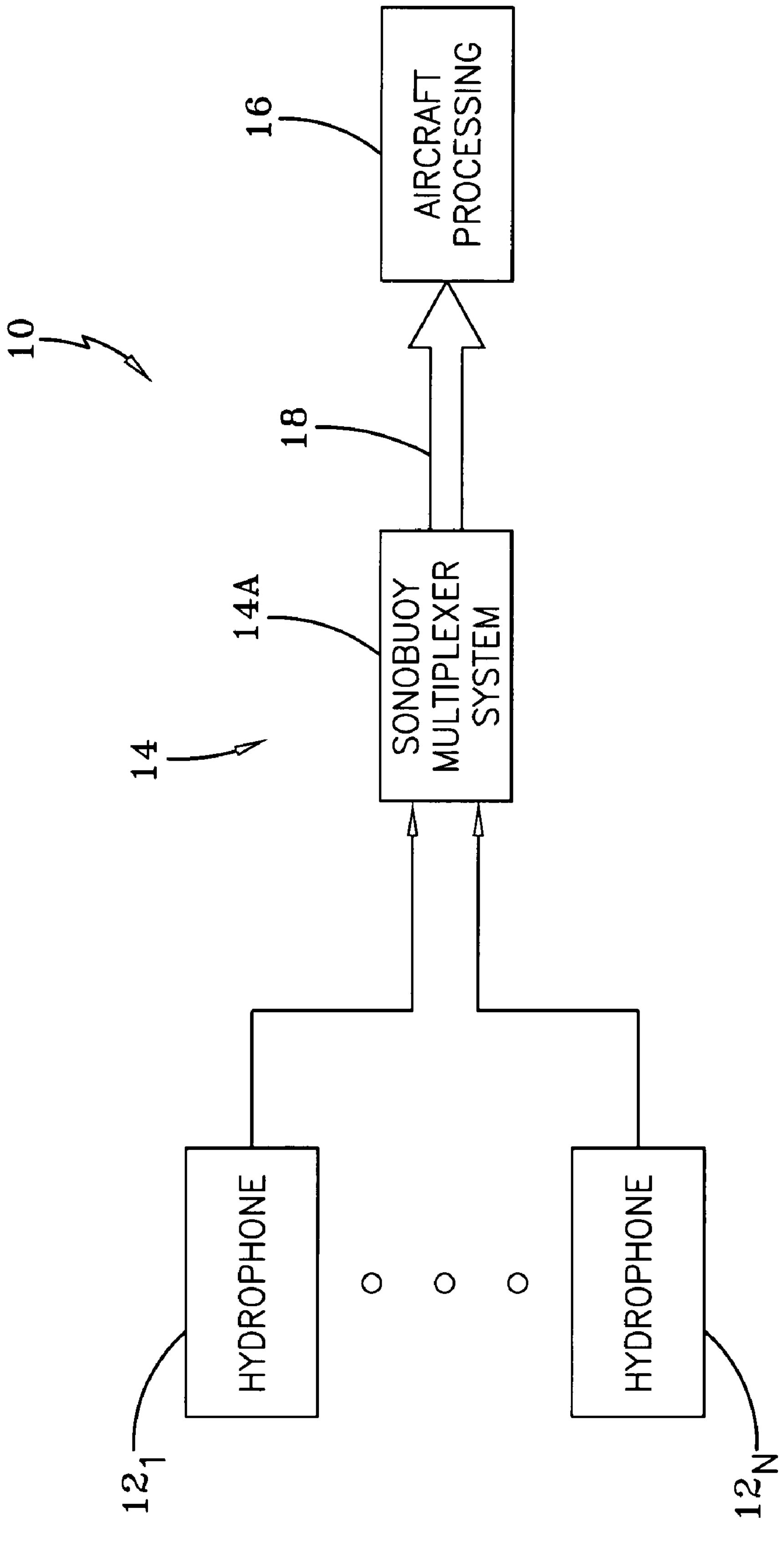
FIG. 1 is a block diagram illustrating the interrelationship between the hydrophones, sonobuoys, and aircraft all related to the present invention.

With reference to the drawings, FIG. 1 is a block diagram illustrating the interrelationship between a plurality of hydrophones $\mathbf{12}_1, \ldots \mathbf{12}_N$, sonobuoy 14 having a multiplexer system 14A associated with the present invention to be further described, and aircraft 16 performing processing.

The system 14A, and a method of operation thereof, improves the contents of RF link 18 contained in beams employed between a transmitting sonobuoy 14 and an associated receiving and processing aircraft 16. The sonobuoy 14, in particular, the sonobuoy multiplexer system 14A, receives acoustic information from the hydrophones $\mathbf{12}_1 \ldots \mathbf{12}_N$ and transmits the information to the aircraft 16 via the RF link 18. The acoustic information has an acoustic bandwidth within a predetermined frequency spectrum.

In general, the system 14A of the present invention breaks the total frequency spectrum of the beams into sub-beams. More particularly, the frequency spectrum defines an acoustic bandwidth of about 750 Hz that is broken into a selected number (e.g., 6 or 4) of sub-bands. The sub-bands are multiplexed onto the RF link 18 interconnecting the sonobuoy 14 to the aircraft 16. The sub-bands are provided, so as to only form enough beams in a sub-beam so that at the upper end of the frequency band of the sub-beam, the scalloping loss, known in the art, is no greater than 3 dB.

As discussed in the "Background" section, at the low end of a frequency band W contained in the RF link 18, not as many beams are utilized as utilized at the high end of the frequency band W. This limitation is overcome by the practice of the present invention by breaking the total frequency spectrum contained in the RF link 18 into sub-bands, and only forming enough beams in a sub-band so that the upper end frequency of that sub-band, the scalloping loss is no greater than 3 dB. In cases where the practice of the present invention gives slightly more scalloping loss than 3 dB, a small number of additional beams can be formed (usually one or two) into selected sub-bands. With a sub-band filtering approach practiced by the present invention, a much lower number of total beams need to be formed. The present invention may be further described with reference to FIG. 2.

FIG. 2 illustrates the interrelationship between the band number each identifying a sub-band 1-6, number of beams in each band, and the beam pointing angles within each band number. FIG. 2 shows the implementation of a six (6) sub-band arrangement, wherein sub-band 1 contains nine beams, sub-band 2 contains thirteen beams, sub-band 3 contains fifteen beams, sub-band 4 contains seventeen beams, sub-band 5 contains twenty beams, and sub-band 6 contains twenty-four beams. A review of FIG. 2 reveals the beam pointing angles contained within each number of beams for each sub-band. The six sub-band system 14A that utilizes the beams of FIG. 2 may be further described with reference to FIG. 3.

Figure 3A:
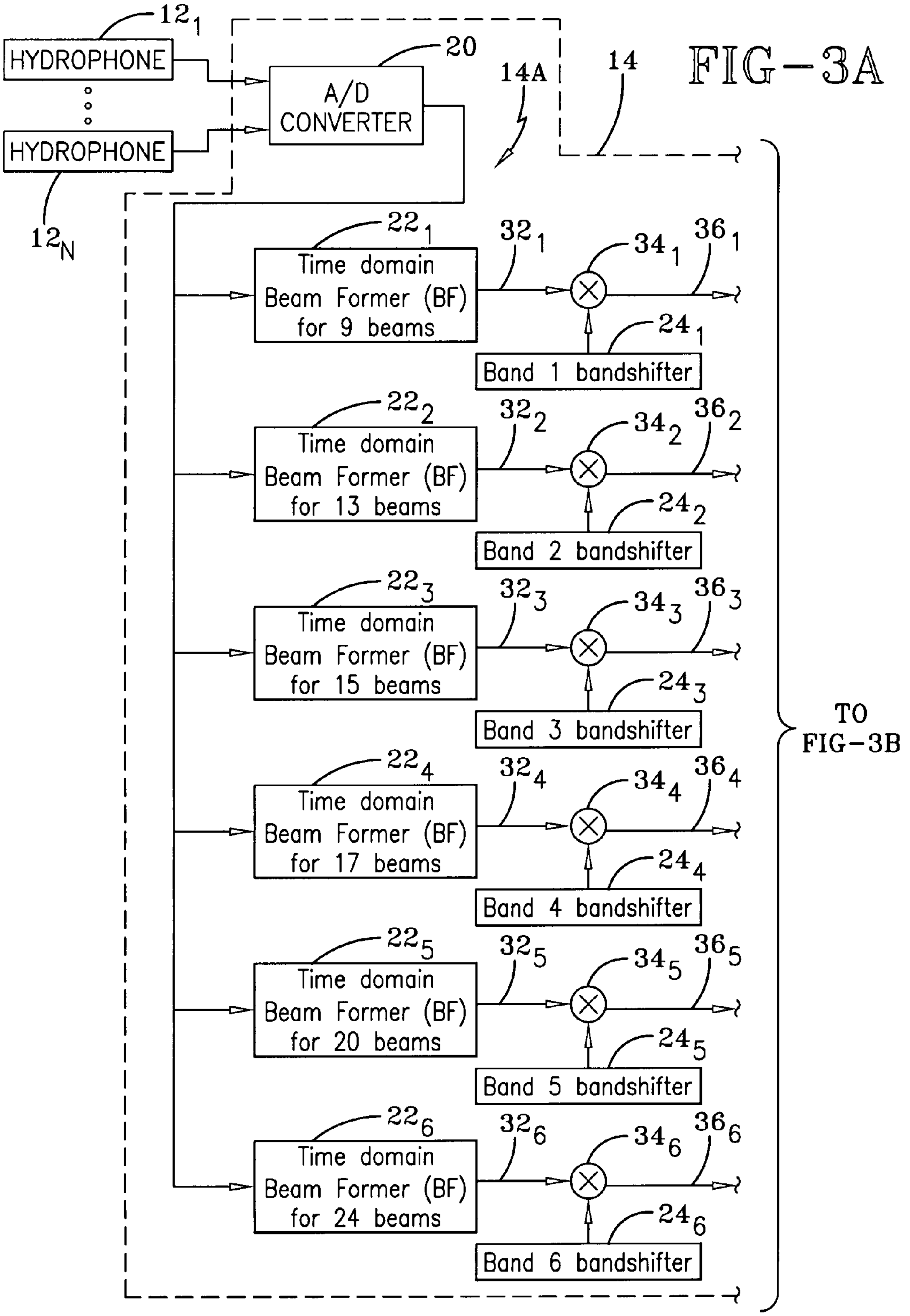
FIG. 3 is composed of FIGS. 3A and 3B that accumulatively illustrate a block diagram of the time domain multiplexing associated with the system of the present invention for a six-band implementation.
Figure 3B:
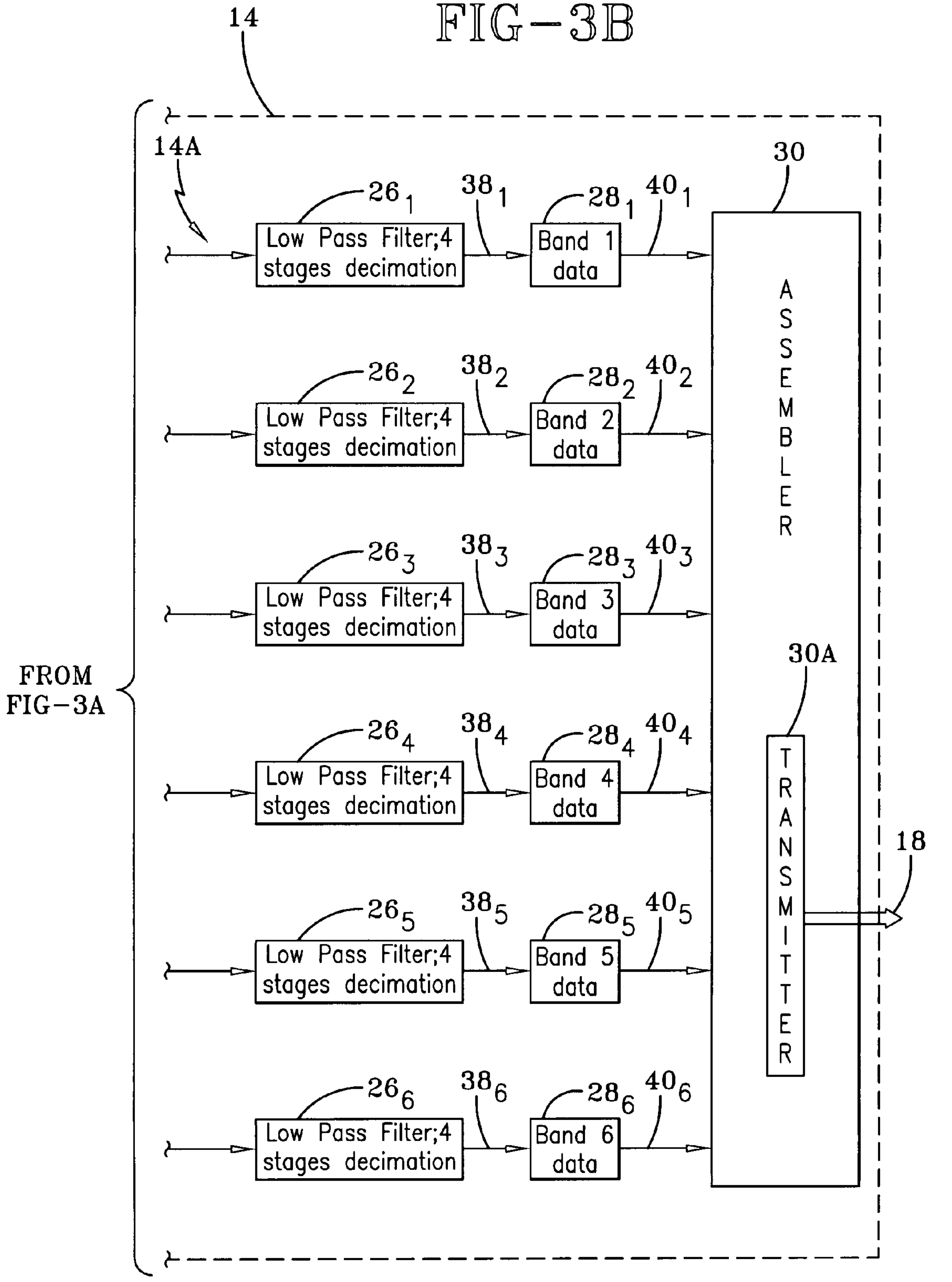

FIG. 3 is composed of FIGS. 3A and 3B that accumulatively shows a functional block diagram of multiplexing system 14A, which employs and which utilizes sub-band filtering. The system 14A utilizes a time division multiplexing technique that interleaves signals associated with the six bands into a single transmission media, that is the RF link 18.

The multiplexer system 14A comprises an analog to digital (A/D) converter 20, time domain beam formers $\mathbf{22}_1$, $\mathbf{22}_2$, $\mathbf{22}_3$, $\mathbf{22}_4$, $\mathbf{22}_5$, and $\mathbf{22}_6$; band shifters $\mathbf{24}_1$, $\mathbf{24}_2$, $\mathbf{24}_3$, $\mathbf{24}_4$, $\mathbf{24}_5$, and $\mathbf{24}_6$; low-pass filters $\mathbf{26}_1$, $\mathbf{26}_2$, $\mathbf{26}_3$, $\mathbf{26}_4$, $\mathbf{26}_5$, $\mathbf{26}_6$; band data $\mathbf{28}_1$, $\mathbf{28}_2$, $\mathbf{28}_3$, $\mathbf{28}_4$, $\mathbf{28}_5$, and $\mathbf{28}_6$; and an assembler 30, which incorporates a transmitter 30A that provides the RF link 18. The multiplexer system 14A of FIG. 3 is arranged into six bands, wherein the specified subscript 1-6 identifies the elements, of a particular sub-band. For example, time domain beam former $\mathbf{22}_1$, operatively cooperates with band shifter $\mathbf{24}_1$, low pass filter $\mathbf{26}_1$, and provides band 1 data $\mathbf{28}_1$, all associated with sub-band 1.

The A/D converter 20 receives acoustic signals from hydrophones $\mathbf{12}_1 \ldots \mathbf{12}_N$ all of which contain frequencies within the acoustic band 0 to 1000 Hz. The A/D converter 20 converts the acoustic information into time series data information that is routed to all of the time domain beam formers $\mathbf{22}_1$, $\mathbf{22}_2$, $\mathbf{22}_3$, $\mathbf{22}_4$, $\mathbf{22}_5$, and $\mathbf{22}_6$. Each of the time domain beam formers $\mathbf{22}_1$, $\mathbf{22}_2$, $\mathbf{22}_3$, $\mathbf{22}_4$, $\mathbf{22}_5$, and $\mathbf{22}_6$ receives identical input information, but generates a different number of beams all within a predetermined frequency spectrum and all within a frequency band W assigned to the sonobuoy 14.

With reference back to FIG. 2, time domain beam formers $\mathbf{22}_1 \ldots \mathbf{22}_6$ respectively for the six sub-bands may respectively include 9, 13, 15, 17, 20 and 24 beams, with each beam defining a narrow path of radiation. As seen in FIG. 2, each sub-band 1-6 has its own unique set of pointing angles. Time domain beam formers $\mathbf{22}_1 \ldots \mathbf{22}_6$, each receiving the digital output of the A/D converter 20 provides one or more beams for each corresponding digital output of the A/D converter 20. Each of the one or more time domain beam formers $\mathbf{22}_1 \ldots \mathbf{22}_6$ has an assigned range of frequency within the overall frequency spectrum defining the frequency band W of the sonobuoy 14. For example beam formers $\mathbf{22}_1$, $\mathbf{22}_2$, $\mathbf{22}_3$, $\mathbf{22}_4$, $\mathbf{22}_5$, and $\mathbf{22}_6$ may respectively be assigned to the range of 250 to 375 Hz, 375 to 500 Hz, 500 to 625 Hz, 625 to 750 Hz, 750 to 875 Hz, and 875 to 1000 Hz, all within a frequency spectrum 250 to 1000 Hz.

For the sake of brevity and clarity, only the interconnections and operation of the elements of sub-band 1, each having a subscript 1 are to be described, with the understanding that similar interconnections and operations of sub-bands 2-6, each having subscripts 2-6 are equally applicable. The output of time domain beam former $\mathbf{22}_1$, present on signal path $\mathbf{32}_1$, is applied to a conventional multiplier circuit $\mathbf{34}_1$, also having on its other input the output of band shifter 24. The output of multiplier circuit $\mathbf{34}_1$ is applied to low pass filter $\mathbf{26}_1$ via signal path $\mathbf{36}_1$. The low pass filter $\mathbf{26}_1$ only allows the desired portion of the frequency assigned to sub-band 1 to pass. The low pass filter $\mathbf{26}_1$ filters and decimates sub-band 1. Because all the sub-bands are within the same bandwidth, the same filter coefficients can be used for all sub-bands.

Each sub-band, such as sub-band 1, now contains the number of samples proportional to the minimum number of required beams. Low pass filter $\mathbf{26}_1$ is tuned to its particular region and only allows its selected range of frequency band W to pass, wherein the composite output of all the filters $\mathbf{26}_1 \ldots \mathbf{26}_6$ supplies the complete frequency spectrum of the frequency band W. The output of low pass filter $\mathbf{26}_1$ is separately outputted on signal path $\mathbf{38}_1$ and is shown as band 1 data $\mathbf{28}_1$. The band 1 data $\mathbf{28}_1$ is routed to assembler 30 having a transmitter 30A incorporated therein.

If desired, rather than utilizing band pass filters, such as $\mathbf{26}_1 \ldots \mathbf{26}_6$, the selected band, such as sub-band 1, may be baseband translated to inphase and quadrature components for minimum bandwidth. Baseband is a communication technique in which digital signals are placed onto a transmission line without any change in modulation thereof. The translation to the baseband utilizing inphase and quadrature components may be accomplished in a manner known in the art.

As previously mentioned, it is desired to form only enough beams in a sub-band so that at the upper frequency of that sub-band the scalloping loss is no greater than 3 dB. This is accomplished by the present invention by computing beam patterns generated on a per Hz basis at the upper frequency of each band e.g., 375 Hz for sub-band 1. The patterns are computed over 360 degrees to determine the amount of overlap. In cases where the scalloping loss is greater than 3 dB, the present invention adds one or two beams to the associated band.

All the band components defined by band data $\mathbf{28}_1 \ldots \mathbf{28}_6$ are respectively routed, via signal paths $\mathbf{40}_1 \ldots \mathbf{40}_6$ to an assembler 30. The assembler 30 assembles all of the data associated with band data $\mathbf{28}_1 \ldots \mathbf{28}_6$ and applies the result to a conventional transmitter 30A that places the data into the RF link 18 that is transmitted to the aircraft 16 for processing. The assembler 30 operates in a manner such that each sub-band is grouped with the number of beams from that band. All sub-bands are then grouped into a frame of data with additional information needed for RF transmissions and receptions of the RF signal. The aircraft 16 processing may be further described with reference to FIG. 4.

Figure 4:
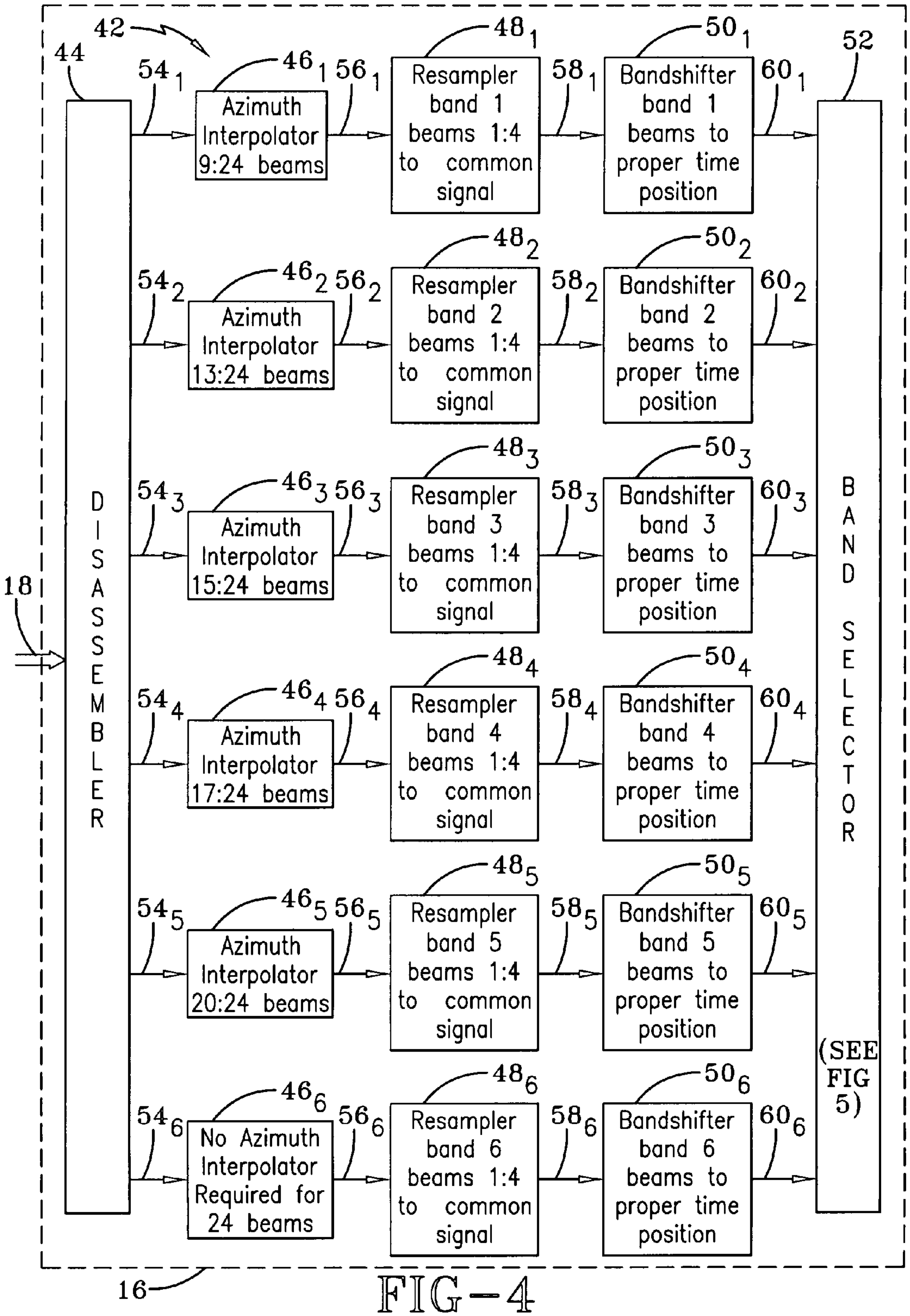
FIG. 4 is a block diagram of the time domain associated with the aircraft processing of the information related to the system of FIG. 3.

FIG. 4 illustrates an arrangement 42 within the aircraft 16, which accommodates the format of information contained with the RF link 18 that an existing aircraft 16 expects for processing. More particularly, before successful processing of data can be performed in the aircraft 16, it is necessary to rearrange the data used by the aircraft 16 so as to provide the same number of beams within the frequency band W that it would have received prior to the formatting of the multiplexer system 14A of FIG. 3. For one application, the same number of beams within the frequency band W is 24.

The arrangement 42 comprises a disassembler 44, azimuth interpolators devices $\mathbf{46}_1$, $\mathbf{46}_2$, $\mathbf{46}_3$, $\mathbf{46}_4$, $\mathbf{46}_5$, $\mathbf{46}_6$; resampler devices $\mathbf{48}_1$, $\mathbf{48}_2$, $\mathbf{48}_3$, $\mathbf{48}_4$, $\mathbf{48}_5$, and $\mathbf{48}_6$; band shifters $\mathbf{50}_1$, $\mathbf{50}_2$, $\mathbf{50}_3$, $\mathbf{50}_4$, $\mathbf{50}_5$, and $\mathbf{50}_6$; and a band selector 52. For the application accommodated by circuit arrangement 42 of FIG. 4, the number of beams found over a frequency band W is 24. With regard to sub-band 1 and in as a matter previously described with reference to FIG. 2, the number of beams contained within sub-band 1 is 9. Therefore, nine (9) beams have to be interpolated relative to the 24 beams by azimuth interpolator $\mathbf{46}_1$, so as to be consistent with the 24 beam format expected by the processing of aircraft 16.

In the manner previously described with reference to FIG. 3, and again for the sake of brevity and clarity, the operation of the circuit arrangement 42 will be described with reference to the associated circuit operation for sub-beam 1 having elements identified by the subscript 1, although it is understood that the operative cooperation between the devices associated with sub-band 2-6, identified by subscripts 2 and 6 respectfully, cooperate with each other in a manner described with sub-band 1.

The data comprised of frames contained in RF link 18 is applied to the disassembler 44 which disassembles the frames composed of bits of data making up blocks of data into individual sub-bands 1-6. The disassembler 44 performs the inverse operations of the assembler 30 in that it takes the data frame of all the sub-bands and separates each sub-band into a block of data which contains the number of beams for that data, i.e., sub-band 1, is a block of data containing nine beams. The individual sub-bands, such as sub-band 1, is applied to azimuth interpolator $\mathbf{46}_1$, via signal path $\mathbf{54}_1$. The azimuth interpolator $\mathbf{46}_1$ takes each of its unique number of beams, i.e., nine (9), and interpolates the number of beams nine (9) up to 24 beams per sub-band, wherein each of the 24 beams from each sub-band 1-6 has the same 24 beam pointing angles, such as shown for band 6 of FIG. 2. Azimuth interpolator $\mathbf{46}_1$ performs its operation and provides the corresponding output to resampler device $\mathbf{48}_1$, via signal path $\mathbf{56}_1$. The azimuth interpolator $\mathbf{46}_1$ provides interpolation for each sub-band by providing multiple weighted sums of the original beams of each sub-band. For instance, the nine beams of sub-band 1 generates an additional 15 beams by adding various weight and summed combinations of its original nine beams.

The resampler $\mathbf{48}_1$ provides an interpolation factor of 1:4, so as to place the data contained within sub-band 1 at a higher sampling rate. More particularly, the output of resampler $\mathbf{48}_1$ is four (4) times the rate present at the input to resampler $\mathbf{48}_1$. The resampler $\mathbf{48}_1$ provides an output, via signal path $\mathbf{58}_1$ to band shifter $\mathbf{50}_1$.

The band shifter $\mathbf{50}_1$ shifts the frequency of the data associated with sub-band 1 from its base band position to its unique position and frequency space that it once occupied prior to the being placed into sub-band 1. With the data of all the sub-bands 1-6 now at the same sampling rate (outputs of elements $\mathbf{48}_1 \ldots \mathbf{48}_6$), and all beams having the same 24 pointing angles (output of azimuth interpolators $\mathbf{46}_1 \ldots \mathbf{46}_6$), the sub-bands 1-6 are transmitted to band selector 52 by way of signal paths $\mathbf{60}_1 \ldots \mathbf{60}_6$. The band selector 52 may be further described with reference to FIG. 5.

Figure 5A:
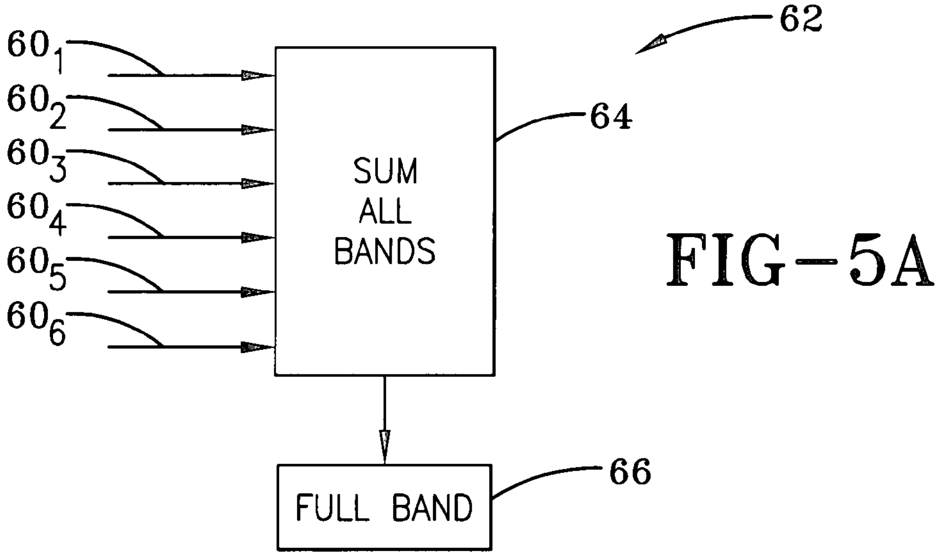
FIG. 5 is composed of FIGS. 5A, 5B, and 5C, each illustrating different band selection associated with the practice of the present invention.
Figure 5B:
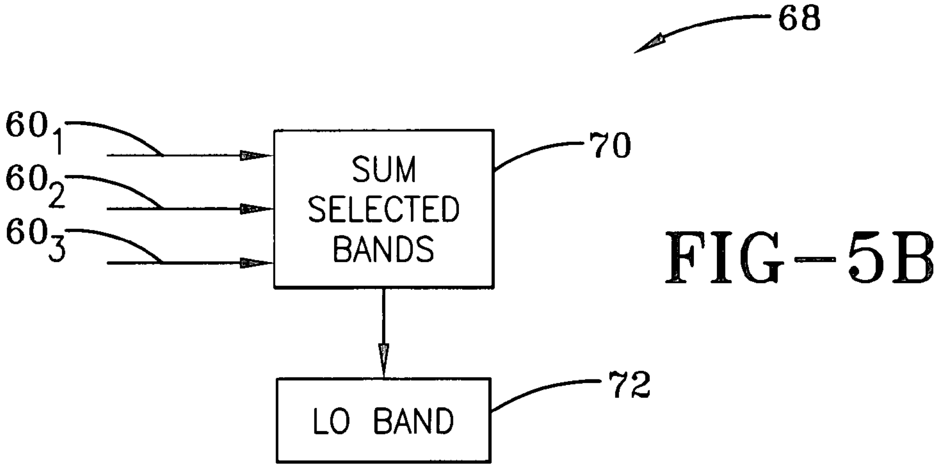
Figure 5C:
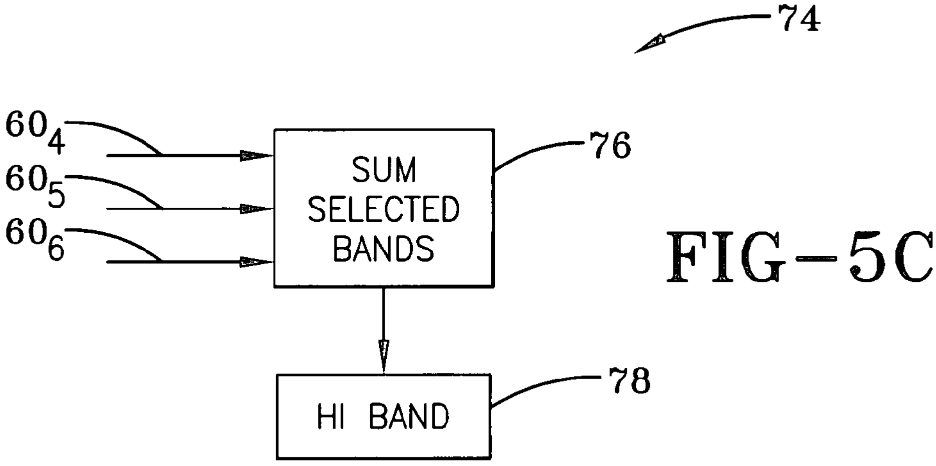

FIG. 5 is composed of FIGS. 5A, 5B, and 5C, wherein FIG. 5A shows the attainment of full band including all the information contained in sub-bands 1-6; FIG. 5B shows the attainment of low band which, for example, contains the information for sub-band 1-3, and FIG. 5C shows the attainment of a high band which contains the information of sub-bands 5-6.

FIG. 5A is an arrangement 62 with a summer 64 having as its inputs in the information contained on signal path $\mathbf{60}_1$, $\mathbf{60}_2$, $\mathbf{60}_3$, $\mathbf{60}_4$, $\mathbf{60}_5$, and $\mathbf{60}_6$. The summer 62 receives and sums all of the information contained in sub-bands 1-6 and provides full-band data illustrated in FIG. 5A by box 66.

FIG. 5B illustrates an arrangement 68 having a summer 70 that receives inputs contained on signal path $\mathbf{60}_1$, $\mathbf{60}_2$, and $\mathbf{60}_3$. The summer 70 accepts the information of sub-band 1-3 and provides a low band data illustrated in FIG. 5B by box 72.

FIG. 5C illustrates an arrangement 74 having a summer 76, which accepts the information contained on signal paths $\mathbf{60}_4$, $\mathbf{60}_5$, and $\mathbf{60}_6$ and previously described for sub-band 4-6 respectively. The summer 76 receives the information within sub-bands 4-6 and provides an output 78 containing the high band information as shown in FIG. 5C as box 78.

It should now be appreciated that the practice of the present invention provides a system and method of operation thereof and operates by breaking the total frequency spectrum, defining the frequency band W of sonobuoy 14 into sub-band 1-6, so as to more effectively utilize the beam distribution containing acoustic information.

More particularly, with reference to FIG. 2, when the six (6) sub-beam system 14A of FIG. 3 is utilized, a total number of beam in the sub-bands is 98 which may be derived by counting the beams under the number of beam columns. By comparison, if a prior art single band approach is used, the total number of beams is 144. This number of 144 is obtained by an allocation of 24 beams for each sub-band (24×6=144). Accordingly, the invention provides an economy of beams while still allowing transmission or more beam pointing angles because each sub-band 1-5 has different beam pointing angles, except for 0; as compared to a single band approach all utilizing the beam pointing angles that are the same as that shown for band 6 of FIG. 2.

The comparison between the sub-band version of the practice of the present invention versus full band approach of prior art systems, may be further described with reference to FIG. 6.

Figure 6:
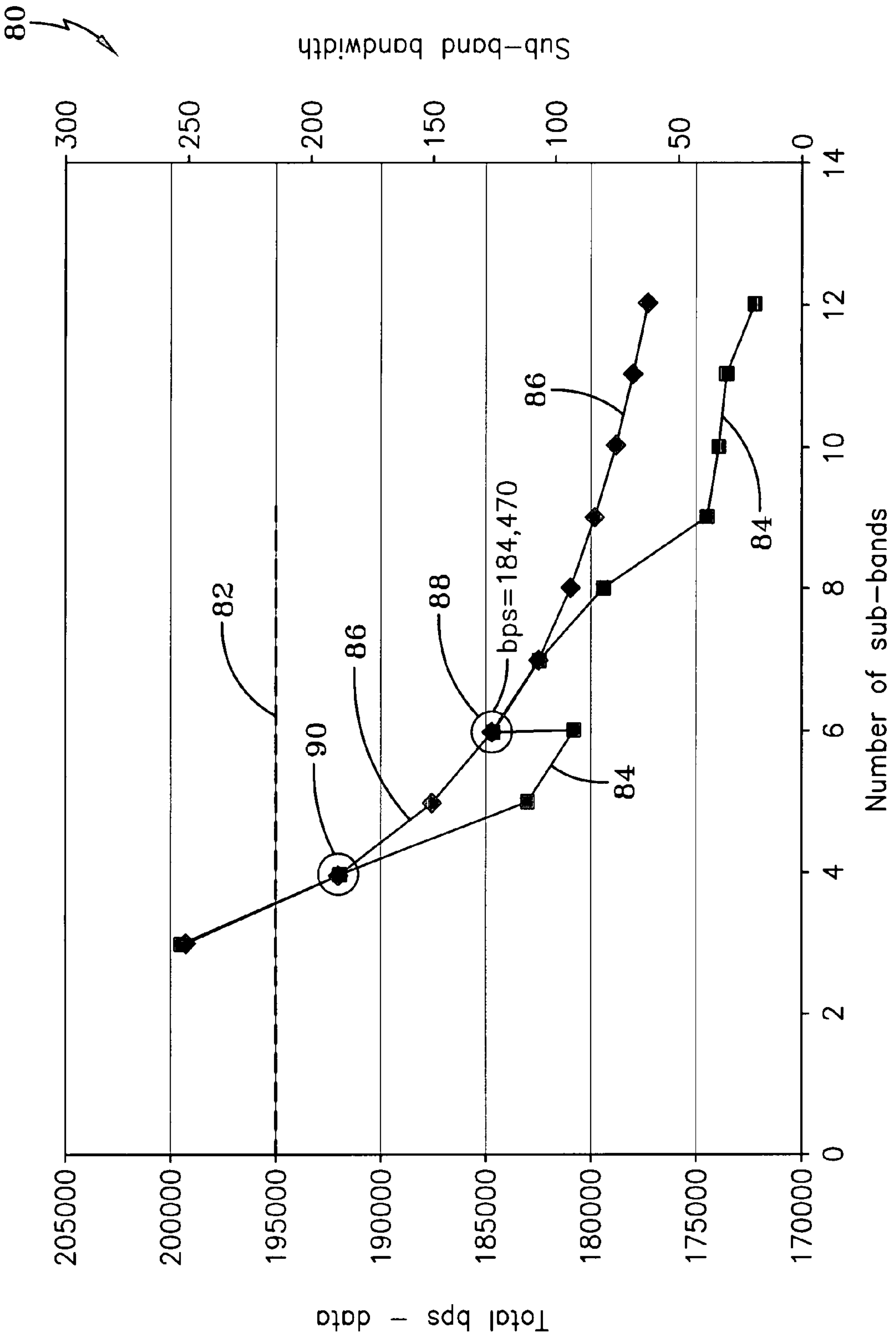
FIG. 6 illustrates various plots associated with the sub-bands implementation of the present invention and showing the relationship between a number of sub-bands and their respective data rate.

FIG. 6 shows a family of curves 80 that comprises plots 82, 84, and 86. Plot 82 is a straight line showing the current rate of data 195000 bps contained in RF links of prior art sonobuoys as discussed in the "Background" section. Plot 84 shows the rate of data given in bps that is limited to the number of sub-bands employed. Similarly, Plot 86 shows the bandwidth, that is, acoustic bandwidth associated with the sub-band employed along with its data rate.

FIG. 6 illustrates, among other things, the results obtained by the implementation of the present invention for six (6) sub-bands, that is the data rate, identified within circle 88 as being equal to 184,470 bps. This same six (6) sub-band implementation, provides each sub-band with an acoustic bandwidth of 125 Hz so that a six (6) sub-band system 14A provides a total acoustic bandwidth of 750 Hz (125×6=750).

Accordingly, it should now be appreciated that the practice of the present invention provides for a system and a method of operation thereof, which allows for an increase in the acoustic bandwidth of sonobuoys from the prior art limitation of 500 Hz to about 750 Hz, while maintaining essentially the same data rate, that is 184,470 bps instead of the prior art 195000 bps. This is accomplished by breaking up the total acoustic bandwidth (750) into a small number of bands, e.g., 6 as previously discussed with reference to FIGS. 1-5, rather than the use of one large band which limits the acoustic bandwidth successfully transmitted from prior art sonobuoys to 500 Hz.

As seen in FIG. 6, as the number of sub-bands decreases, the in buoy processing rate and complexity increases. More particularly, it is seen that the selection of a 4 sub-band yields a data rate, defined by circle 90, of approximately 192000 bps and a sub-band bandwidth of 187.5 so that the total bandwidth within the four sub-bands is 750. The implementation of a multiplexer system utilizing a four sub-band is preferred over the previously described six (6) sub-band system 14A of FIGS. 1-6 because of the lower in buoy processing rate and may be further described with reference to FIG. 7.

Figure 8A:
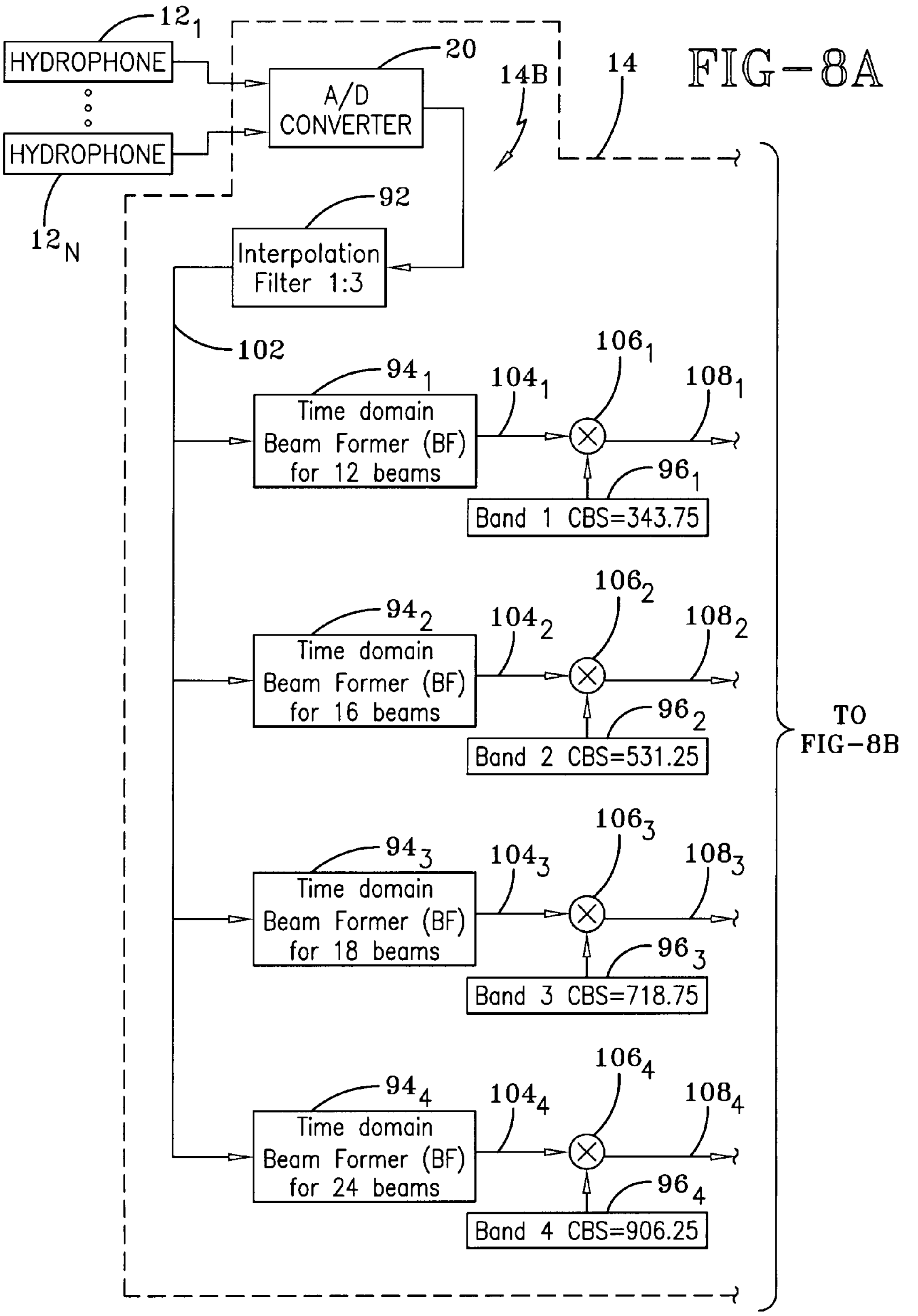
FIG. 8 is composed of FIGS. 8A and 8B that accumulatively illustrate a block diagram of the time domain multiplexing of the present invention associated with four (4) sub-band system implementation.
Figure 8B:
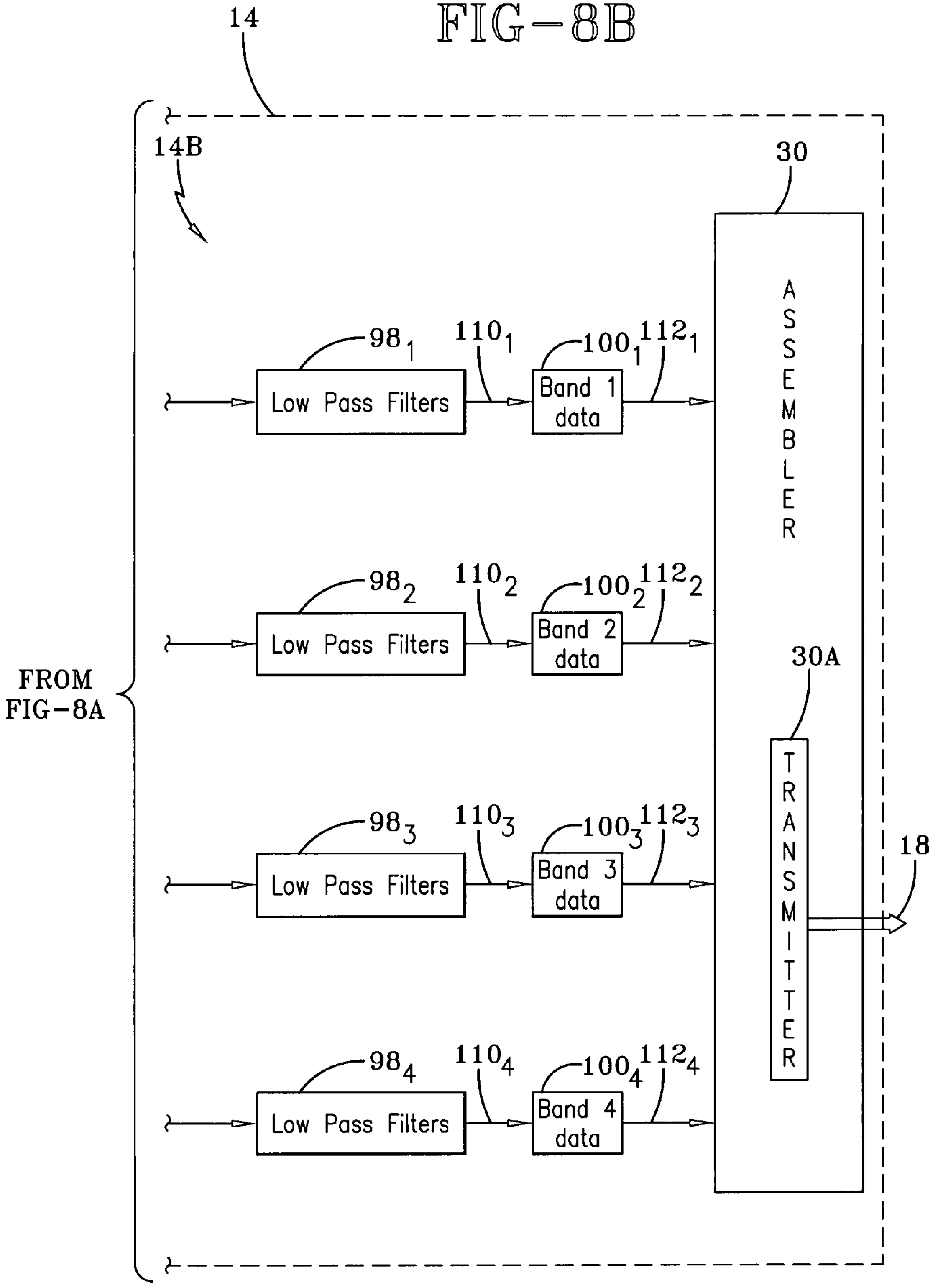

FIG. 7 is similar to FIG. 2, but shows the characteristics of the number of beam utilized for a four (4) sub-band system, wherein sub-band 1 comprises 12 beams, sub-band 2 comprises 16 beams, sub-band 3 comprises 18 beams, and sub-band 4 comprises 24 beams. FIG. 7 further shows the beam pointing angles of the beams within each sub-band. The sub-band 4 implementation of the present invention may be further described with reference to FIG. 8, which is composed of FIGS. 8A and 8B.

FIG. 8 illustrates an arrangement 14B composed of time domain beam formers $\mathbf{94}_1$, $\mathbf{94}_2$, $\mathbf{94}_3$, and $\mathbf{94}_4$; band shifter $\mathbf{96}_1$, $\mathbf{96}_2$, $\mathbf{96}_3$, and $\mathbf{96}_4$; lower pass filters $\mathbf{98}_1$, $\mathbf{98}_2$, $\mathbf{98}_3$, $\mathbf{98}_4$; band data $\mathbf{100}_1$, $\mathbf{100}_2$, $\mathbf{100}_3$, and $\mathbf{100}_4$; and assembler 30 having a transmitter 30A incorporated therein.

The arrangement 14B of FIG. 8 is quite similar to arrangement 14 of FIG. 3 with the exception of the addition of an interpolation filter 92. Similarly, the elements $\mathbf{94}_1$, . . . $\mathbf{94}_4$; $\mathbf{98}_1$ . . . $\mathbf{98}_4$; and $\mathbf{100}_1$ . . . $\mathbf{100}_4$ of FIG. 8 are quite similar to elements $\mathbf{22}_1$ . . . $\mathbf{22}_6$; $\mathbf{26}_1$ . . . $\mathbf{26}_6$; $\mathbf{28}_1$ . . . $\mathbf{28}_6$, of FIG. 3, except that the elements of FIG. 8 are related to a sub-band 4 configuration, whereas the elements of FIG. 3 are related to a sub-band 6 configuration.

The band shifters $\mathbf{96}_1$ . . . $\mathbf{96}_4$, of FIG. 8 are different than the band shifters $\mathbf{24}_1$ . . . $\mathbf{24}_6$ of FIG. 3, in that the band shifters $\mathbf{96}_1$ . . . $\mathbf{96}_4$ provide for a complex band shift wherein each sub-bands i.e., 1-4 is shifted from their unique position of the frequency spectrum to a baseband centered around number 0 Hz. For example, for sub-band 1 is shifted from 250 Hz to 443.75 Hz, with a band shift frequency of 343.75.

In operation and with reference to FIG. 8, the A/D converter 20 receives acoustic information from hydrophones $\mathbf{12}_1$ . . . $\mathbf{12}_N$. The A/D converter 20 converts the received acoustic information into time series data which is routed to filter 92 preferably having an interpolation factor of 1:3 which, in turn, performs its desired filtering and places in its output on signal path 102 that is routed to time domain beam formers $\mathbf{94}_1$ . . . $\mathbf{94}_4$. The interpolation factor of 1:3 accomplishes an increase of sampling frequency fs to 3 fs so as to allow for better beam forming.

As discussed with reference to FIGS. 3 and 4, and again for the sake of brevity and clarity, the operation of the circuit 14B of FIG. 8 will be described with reference to sub-band 1 whose elements are identified by the use of subscript 1 and with the understanding that the operation of the elements sub-band 2-4, respectively identified by subscripts 2-4 is equally applicable in the operation of sub-band 1 elements.

The time domain beam former $\mathbf{94}_1$, in response to the received digital outputs on signal path 102 provides twelve (12) beams within a predetermined frequency spectrum of the frequency band W of the RF link 18 in a manner similar to that described for time domain beam former $\mathbf{22}_1$. The time domain beam former $\mathbf{94}_1$, provides its output on signal path $\mathbf{104}_1$ which is connected to a conventional multiplier $\mathbf{106}_1$ which has on its other input the output of the band shifter $\mathbf{96}_1$. The multiplier $\mathbf{106}_1$ combines its received inputs and places the combined information on signal path $\mathbf{108}_1$ that is routed to low pass filter $\mathbf{98}_1$.

The low pass filter $\mathbf{98}_1$ filters its specified range of frequencies and passes its output on to signal path $\mathbf{110}_1$, whose information is identified on FIG. 8 as band 1 data $\mathbf{100}_1$. The band 1 data $\mathbf{100}_1$ is placed on signal path 112, which is connected to the assembler 30 having a transmitter 30A. Assembler 30 and transmitter 30 each operates in a similar manner as previously described with reference to FIG. 3.

For some embodiments, the time series data present on signal path 102 may preferably have a frequency of $F_s$=15,058.8235. Time domain beam former $\mathbf{94}_1$, is selected to provide a decimation of 4 so that it provides an output of $F_s$=3764.706 which is routed to multiplier 106$_1$ which, in turn, applies its output to low pass filter 98$_1$, via, signal path 108$_1$. The low pass filter 98$_1$ is selected so as to provide for a decimation of 16 so as to provide an output on signal path 110$_1$ of $F_s$=235.2941.

All of the sub-band samples contained in band data 100$_1$, 100$_2$, 100$_3$, and 100$_4$ are assembled by assembler 30 and transmitter 30A into an up link frame on RF link 18 which is approximately 192000 bps. The RF link 18 is transmitted to the aircraft 16 for processing therein, which may be further described with reference to FIG. 9.

Figure 9:
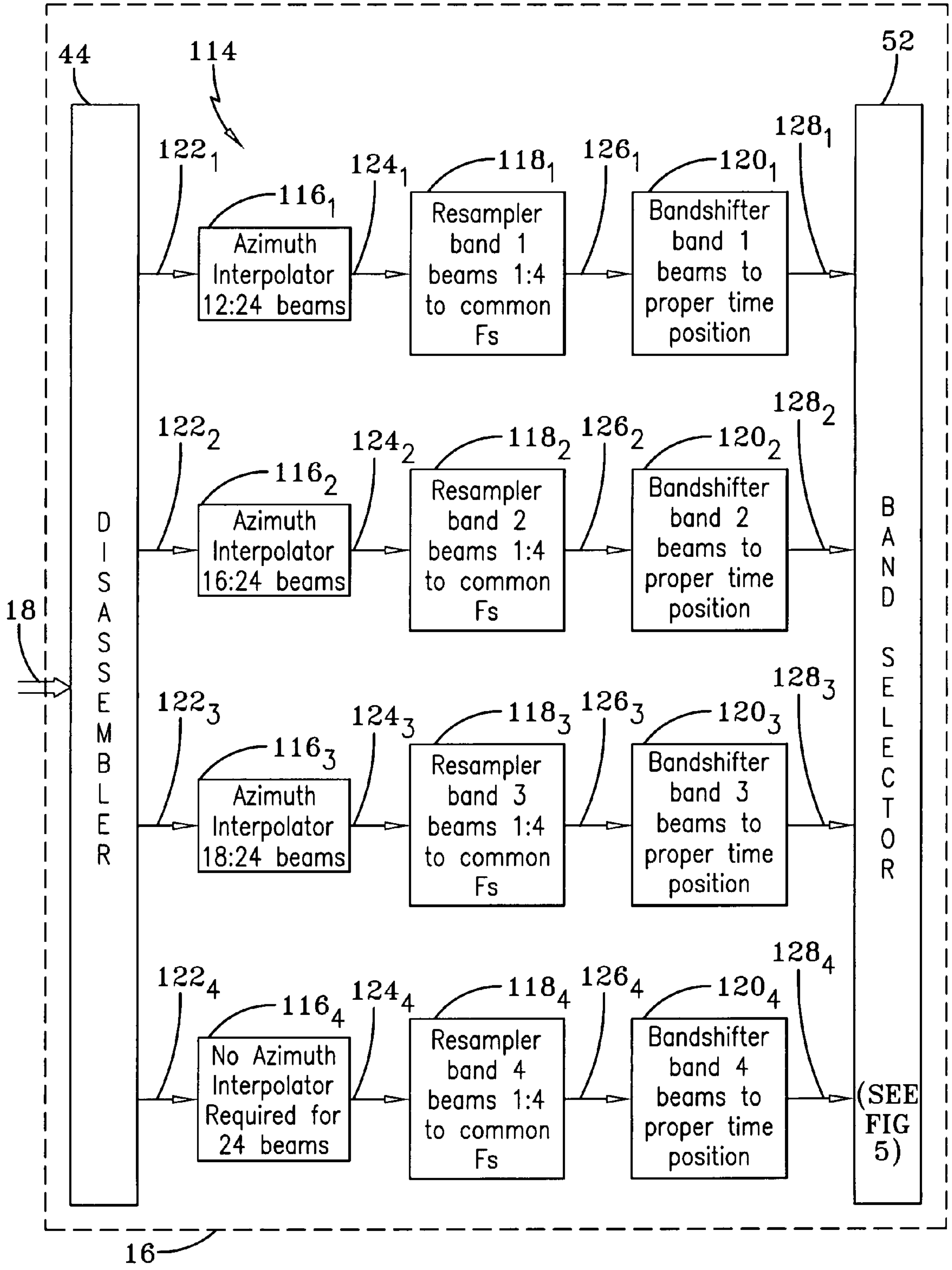
FIG. 9 is a block diagram of the time domain associated with the aircraft processing of the four (4) band information provided by the system of FIG. 8.

The disassembler 44 disassembles the frames contained in a RF link 18 into individual bands 1-4 in a manner as previously described with reference to FIG. 4. The data for sub-bands 1, 2, 3 and 4, are respectively routed to azimuth interpolators 116$_1$, 116$_2$, 116$_3$, and 116$_4$, via signal path 122$_1$, 122$_2$, 122$_3$, and 122$_4$, respectively. With reference to FIG. 9, it should be understood that the description to be given for the elements of sub-band 1 identified by subscript 1 is equally applicable to the elements of sub-bands 2-4 of FIG. 9 identified by the subscripts 2-4.

Azimuth interpolator 116$_1$, operates in a similar manner as previously discussed for azimuth interpolator 46$_1$, but interpolates for 12 beams relative to 24 beams, rather than azimuth interpolator 46$_1$ interpolation of 9 beams relative to 24 beams.

The resampler 118$_1$ operates in a manner similar to resampler 48$_1$ and resamples the information related to sub-band 1 by an interpolation factor of 1:4 and places its band information at a higher sampler rate. Resampler 118$_1$ provides its sampled information on signal path 126$_1$, which is routed to band shifter 120$_1$. The band shifter 120$_1$ shifts sub-bands from its baseline position to its unique position in frequency space and applies the output of signal path 128$_1$ which is routed to band selector 52. Band shifter 120$_1$ operates in a manner similar to band shifter 50$_1$ of FIG. 4. The band selector 52 operates in a manner as previously described with reference to FIG. 5.

If the signal arriving at the disassembler 44 is $F_s$=235.2941, then resamplers 118$_1$ . . . 118$_4$ provide an output signal $F_s$=941.1764.

It should now be appreciated that the practice of the present invention provides for a system shown in FIGS. 8 and 9, which allows for an increase in acoustic bandwidth from the prior art limitation of about 500 Hz to about 750 Hz while maintaining essentially the same data link bit rate of about 256,000 hps. The present invention rather than relying on prior art techniques of having a RF link containing a single band comprising acoustic data within a 500 Hz acoustic band, provides a RF link containing four or six bands of acoustic data that successfully arrives at the aircraft for processing thereby yielding acoustic data within an acoustic band of about 750 Hz.

Although the invention has been described relative to specific embodiments thereof related to four or six sub-bands, there are numerous variations and modifications that will be readily apparent to those skilled in the art in light of the above teaching. It is therefore understood that, within the scope of independent claims, the invention may be practiced other than as specifically described.

I claim:

1. A system for transmitting, via a RF link, to remote equipment acoustic information having an acoustic bandwidth and a predetermined frequency spectrum; said system comprising:

a) an A/D converter receiving acoustic signals each signal having a frequency within said acoustic bandwidth, said A/D converter providing a corresponding digital output for each received acoustic signal;

b) four beam formers receiving said digital outputs of said A/D converter and providing beams at respective outputs for each of said corresponding digital outputs of said A/D converter, each of said four formers having an assigned sub-band, said four (4) beam formers, respectively providing sub-bands 1 to 4, with sub-band 1 comprising twelve (12) beams, sub-band 2 comprising sixteen (16) beams, sub-band 3 comprising eighteen (18) beams, and sub-band 4 comprising twenty-four (24) beams;

c) one or more band shifters respectively interconnected to said outputs of said beam formers, each of said one or more band shifters shifting the frequency spectrum of the assigned sub-band of a respective output of said four beam formers and providing a respective output; and, d) one or more filters receiving the output of said one or more band shifters and providing a respective output that prohibits all, but the specified range of said frequency spectrum of respective outputs of said four beam formers.

2. A system for transmitting, via a RF link, to remote equipment acoustic information having an acoustic bandwidth and a predetermined frequency spectrum; said system comprising:

a) an A/D converter receiving acoustic signals each signal having a frequency within said acoustic bandwidth, said A/D converter providing a corresponding digital output for each received acoustic signal;

b) six beam formers receiving said digital outputs of said A/D converter and providing beams at respective outputs for each of said corresponding digital outputs of said A/D converter, each of said six beam formers having an assigned sub-band, said six (6) beam formers, respectively providing sub-bands 1 to 6, with sub-band 1 comprising nine (9) beams, sub-band 2 comprising thirteen (13) beams, sub-band 3 comprising fifteen (15) beams, sub-band 4 comprising seventeen (17) beams, sub-band 5 comprising twenty (20) beams, and sub-band 6 comprising twenty-four (24) beams;

c) one or more band shifters respectively interconnected to said outputs of said beam formers, each of said one or more band shifters shifting the frequency spectrum of the assigned sub-band of a respective output of said beam formers and providing a respective output; and, d) one or more filters receiving the output of said one or more band shifters and providing a respective output that prohibits all, but the specified range of said frequency spectrum of respective outputs of said beam formers.

3. The system according to claim 1, wherein each beam within each sub-band is representative of a plurality of beam pointing angles.

4. The system according to claim 2, wherein each beam within each sub-band is representative of a plurality of beam pointing angles.

5. The system according to claim 1 that employs a time division technique.

6. The system according to claim 1, further comprising a circuit arrangement accepting said RF link and having means for reformatted said assigned sub-bands of said one or more beam formers into a single band that covers said predetermined frequency spectrum of said RF link.

* * * * *